United States Patent
Kawamura et al.

(10) Patent No.: US 7,236,685 B2
(45) Date of Patent: Jun. 26, 2007

(54) REPRODUCTION SPEED CONVERSION APPARATUS

(75) Inventors: Takashi Kawamura, Osaka (JP);
Masahiro Sueyoshi, Osaka (JP);
Hideki Ishii, Osaka (JP); Akira Soota, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1021 days.

(21) Appl. No.: 10/249,432

(22) Filed: Apr. 8, 2003

(65) Prior Publication Data

US 2003/0198460 A1  Oct. 23, 2003

(30) Foreign Application Priority Data

Apr. 19, 2002 (JP) .............................. 2002-117245

(51) Int. Cl.
*H04N 5/91* (2006.01)
*H04N 7/00* (2006.01)

(52) U.S. Cl. .......................................... 386/68; 386/95

(58) Field of Classification Search ................... 386/68, 386/95, 96
See application file for complete search history.

(56) References Cited

U.S. PATENT DOCUMENTS

2002/0080399 A1 * 6/2002 Nakagawa ................ 358/1.15

* cited by examiner

*Primary Examiner*—Thai Q. Tran
*Assistant Examiner*—Tat Chi Chio
(74) *Attorney, Agent, or Firm*—Snell & Wilmer L.L.P.

(57) ABSTRACT

A reproduction speed conversion apparatus includes an audio decoding section; an audio reproduction speed conversion section; a video reproduction speed conversion section; and a video decoding section. The video reproduction speed conversion section determines whether reproduction speed conversion corresponding to a requested level is possible or not. When the reproduction speed conversion is determined to be possible, the video reproduction speed conversion section performs reproduction speed conversion corresponding to the requested level. When the reproduction speed conversion corresponding to the requested level is determined to be impossible, the video reproduction speed conversion section performs reproduction speed conversion corresponding to a prescribed level lower than the requested level, and outputs a second reproduction speed signal representing the prescribed level to the audio reproduction speed conversion section. The audio reproduction speed conversion section performs reproduction speed conversion corresponding to the prescribed level in response to the second reproduction speed signal.

17 Claims, 8 Drawing Sheets

FIG.3

REPRODUCTION SPEED CONVERSION APPARATUS

BACKGROUND OF INVENTION

1. Field of the Invention

The present invention relates to a reproduction speed conversion apparatus for converting a reproduction speed of video data and a reproduction speed of audio data into an identical reproduction speed.

2. Description of the Related Art

A reproduction speed conversion apparatus converts a reproduction speed of a compression-encoded audio data and a reproduction speed of a compression-encoded video data into a high reproduction speed or a low reproduction speed. Even when the reproduction speeds are thus converted, the reproduced sound is natural to the listener.

FIG. 5 shows a structure of a conventional reproduction speed conversion apparatus 500. The reproduction speed conversion apparatus 500 includes an audio decoding section 501, an audio reproduction speed conversion section 502, a video reproduction speed conversion section 503, and a video decoding section 504.

Hereinafter, an operation of the conventional reproduction speed conversion apparatus 500 for converting a reproduction speed of compression-encoded audio data and a reproduction speed of compression-encoded video data in compliance with the MPEG Standards to a speed 1.2 times the original reproduction speeds will be described.

The audio decoding section 501 receives compression-encoded audio data.

The audio decoding section 501 operates in accordance with, for example, the Dolby AC3 or dts system adopted by the DVD-Video Standard, the MPEG1-layer II system adopted by the CS Digital Standard, MPEG2-AAC system adopted by the BS Digital Standard, the MLP system adopted by the DVD-Audio Standard, or the MP3 (MPEG1-layer III) system commonly used on the Internet.

The audio decoding section 501 decodes the compression-encoded audio data so as to output the decoded audio data. The audio reproduction speed conversion section 502 thins out repeated-waveform portions from the decoded audio data so as to convert the reproduction speed of the decoded audio data into a reproduction speed 1.2 times the original speed.

The video reproduction speed conversion section 503 receives compression-encoded video data in compliance with the MPEG Standards. The compression-encoded video data contains B-Picture, which is differential video data in compliance with the MPEG Standards. The video reproduction speed conversion section 503 thins out the B-Picture so as to convert the reproduction speed of the compression-encoded video data into a reproduction speed 1.2 times the original speed.

The video decoding section 504 decodes the compression-encoded video data so as to output the decoded video data.

The video decoding section 504 operates in accordance with, for example, the MPEG1, MPEG2, or MPEG4 system.

The compression-encoded audio data and the compression-encoded video data may be loaded from a storage device to a data load device.

FIG. 6 shows a structure of another conventional reproduction speed conversion apparatus 600. The reproduction speed conversion apparatus 600 includes a storage device 606 and a data load device 607 in addition to the elements included in the reproduction speed conversion apparatus 500.

The storage device 606 stores compression-encoded audio data and compression-encoded video data in compliance with the MPEG Standards. The compression-encoded audio data and the compression-encoded video data are loaded from the storage device 606 to the data load device 607.

An audio decoding section 601 receives compression-encoded audio data loaded from the storage device 606.

A video reproduction speed conversion section 603 receives the compression-encoded video data in compliance with the MPEG Standards loaded from the storage device 606.

The data load device 607 receives, from the video reproduction speed conversion section 603, a signal representing a reproduction speed obtained by the video reproduction speed conversion section 603, i.e., a reproduction speed 1.2 times the original reproduction speed. Upon receipt of this signal, the data load device 607 loads the compression-encoded audio data and the compression-encoded video data from the storage device 606. Thus, the quantity of the compression-encoded audio data and the compression-encoded video data which are output from the data load device 607 are not in excess or insufficient even when the reproduction speed of the decoded audio data and the reproduction speed of the compression-encoded video data are converted into a reproduction speed 1.2 times the original speeds.

FIG. 7 shows a structure of still another conventional reproduction speed conversion apparatus 700. The reproduction speed conversion apparatus 700 includes an audio decoding section 701, an audio reproduction speed conversion section 702, a video reproduction speed conversion section 703, a video decoding section 704, and an audio video synchronization section 705.

Hereinafter, an operation of the conventional reproduction speed conversion apparatus 700 for converting a reproduction speed of compression-encoded audio data and a reproduction speed of compression-encoded video data in compliance with the MPEG Standards to a speed 1.2 times the original reproduction speeds will be described.

The audio decoding section 701 receives compression-encoded audio data.

The audio decoding section 701 decodes the compression-encoded audio data so as to output the decoded audio data. Upon receipt of audio decoding timing data which represents a timing for decoding the compression-encoded audio data, the audio decoding section 701 decodes the compression-encoded audio data, so as to output the decoded audio data. The audio decoding timing data is output from the audio video synchronization section 705.

The audio reproduction speed conversion section 702 thins out repeated-waveform portions from the decoded audio data so as to convert the reproduction speed of the decoded audio data into the reproduction speed 1.2 times the original speed.

The video reproduction speed conversion section 703 receives compression-encoded video data in compliance with the MPEG Standards. The compression-encoded video data contains B-Picture, which is differential video data in compliance with the MPEG Standards. The video reproduction speed conversion section 703 thins out the B-Picture so as to convert the reproduction speed of the compression-encoded video data into a reproduction speed 1.2 times the original speed.

Upon receipt of video decoding timing data which represents a timing for decoding the compression-encoded video data, the video decoding section 704 decodes thecompression-encoded video data, so as to output the decoded video data. The video decoding timing data is output from the audio video synchronization section 705.

The audio video synchronization section 705 receives an audio time stamp which represents a time for reproducing the decoded audio data and a video time stamp which represents a time for reproducing the decoded video data.

In accordance with the audio time stamp and the video time stamp, the audio video synchronization section 705 synchronizes the timing for reproducing the decoded video data and the timing for reproducing the decoded audio data with each other.

In response to the audio time stamp, the audio video synchronization section 705 generates audio decoding timing data. As described above, the audio decoding section 701 decodes the compression-encoded audio data in response to the audio decoding timing data.

In response to the video time stamp, the audio video synchronization section 705 generates video decoding timing data. As described above, the video decoding section 704 decodes the compression-encoded video data in response to the audio decoding timing data.

The compression-encoded audio data and the compression-encoded video data may be loaded from a storage device to a data load device.

FIG. 8 shows a structure of still another conventional reproduction speed conversion apparatus 800. The reproduction speed conversion apparatus 800 includes a storage device 806 and a data load device 807 in addition to the elements included in the reproduction speed conversion apparatus 700.

The storage device 806 stores compression-encoded audio data, compression-encoded video data in compliance with the MPEG Standards, an audio time stamp, and a video time stamp. The compression-encoded audio data, compression-encoded video data in compliance with the MPEG Standards, an audio time stamp, and a video time stamp are loaded from the storage device 806 to the data load device 807.

An audio decoding section 801 receives compression-encoded audio data loaded from the storage device 806.

A video reproduction speed conversion section 803 receives the compression-encoded video data in compliance with the MPEG Standards loaded from the storage device 806.

An audio video synchronization section 805 receives the audio time stamp and the video time stamp which are loaded from the storage device 806.

The data load device 807 receives, from the audio reproduction speed conversion section 802, a signal representing a reproduction speed obtained by the audio reproduction speed conversion section 802, i.e., a reproduction speed 1.2 times the original reproduction speed. Upon receipt of this signal, the data load device 807 loads the compression-encoded audio data, the compression-encoded video data, the audio time stamp, and the video time stamp from the storage device 806. Thus, the quantity of the compression-encoded audio data, the compression-encoded video data, the audio time stamp, and the video time stamp which are output from the data load device 807 are not in excess or insufficient even when the reproduction speed of the decoded audio data and the reproduction speed of the compression-encoded video data are converted into a reproduction speed 1.2 times the original speeds.

The storage device 606 and the storage device 806 are each, for example, a hard disc. For recording audio data and video data on a hard disc built into a recording and reproduction apparatus, the audio data and the video data are encoded and then the compression-encoded audio data and the compression-encoded video data are recorded on the hard disc. As a system for reproducing the recorded compression-encoded audio data and compression-encoded video data only by the recording and reproduction apparatus, a system of the apparatus' own specifications may be adopted. For example, a system of recording compression-encoded audio data containing B-Picture on the hard disc at an arbitrary ratio may be adopted. Alternatively, a recording system obtained by combining the MPEG Standards and a unique technique may be adopted, by which a greater quantity of data is recorded on the hard disc for a sequence including rapidly-changing scenes and a smaller quantity of data is recorded on the hard disc for a sequence including less rapidly-changing scenes.

As described above, there is conventionally a premise that a recording and reproduction apparatus for recording audio data and video data is identical with a recording and reproduction apparatus for reproducing audio data and video data. Owing to this premise, the reproduction speed conversion apparatus 500, 600, 700 or 800 included in the recording and reproduction apparatus can convert the reproduction speed of the audio data and the reproduction speed of the video data into an identical reproduction speed.

However, the conventional reproduction speed conversion apparatuses 500, 600, 700 and 800 may not be able to convert a reproduction speed of audio data and a reproduction speed of video data which are recorded on a pre-authored recording medium (for example, a DVD-Video medium) or a recording medium possibly having data thereon recorded by another recording apparatus (for example, a DVD-RAM medium). The reason is that since the MPEG Standards for video data provide a high degree of freedom for reproduction speed, video data recorded by a recording apparatus produced by company A cannot always be reproduced by a reproduction apparatus produced by company B.

For example, when converting a reproduction speed of video data into a reproduction speed corresponding to the requested level by thinning out B-Picture, the ratio at which B-Picture appears needs to satisfy the requested level.

SUMMARY OF THE INVENTION

A reproduction speed conversion apparatus according to the present invention includes an audio decoding section for decoding compression-encoded audio data so as to output decoded audio data; an audio reproduction speed conversion section for converting a reproduction speed of the decoded audio data in response to a first reproduction speed signal representing a requested level of reproduction speed; a video reproduction speed conversion section for converting the reproduction speed of compression-encoded video data in response to the first reproduction speed signal; and a video decoding section for decoding the compression-encoded video data which is output from the video reproduction speed conversion section. The video reproduction speed conversion section determines whether reproduction speed conversion corresponding to the requested level is possible or not. When the reproduction speed conversion corresponding to the requested level is determined to be possible, the video reproduction speed conversion section performs reproduction speed conversion corresponding to the requested level. When the reproduction speed conversion corresponding to the requested level is determined to be impossible, the video reproduction speed conversion section performs reproduction speed conversion corresponding to a prescribed level lower than the requested level, and outputs a second reproduction speed signal representing the prescribed level to the audio reproduction speed conversion section. The audio reproduction speed conversion section performs reproduction speed conversion corresponding to the prescribed level in response to the second reproduction speed signal from the video reproduction speed conversion section.

In one embodiment of the invention, the video reproduction speed conversion section determines whether a ratio at which specific video data appears in the compression-encoded video data is larger than a threshold value determined in accordance with the requested level, or not; and determines whether reproduction speed conversion corresponding to the requested level is possible or not based on the determination result.

In one embodiment of the invention, the compression-encoded video data is video data in compliance with the MPEG Standards, and the specific video data is B-Picture.

In one embodiment of the invention, the reproduction speed conversion apparatus further includes an audio video synchronization section for synchronizing a timing for reproducing the decoded audio data and a timing for reproducing the decoded video data with each other, in accordance with an audio time stamp representing a time for reproducing the decoded audio data and a video time stamp representing a time for reproducing the decoded video data. The audio reproduction speed conversion section transmits a signal representing the reproduction speed obtained by the audio reproduction speed conversion section to the audio video synchronization section. The audio video synchronization section generates audio decoded timing data representing a timing for decoding the compression-encoded audio data in response to the audio time stamp and the signal representing the reproduction speed obtained by the audio reproduction speed conversion section. The audio video synchronization section generates video decoding timing data representing a timing for decoding the compression-encoded video data in response to the video time stamp and the signal representing the reproduction speed obtained by the audio reproduction speed conversion section. The audio decoding section decodes the compression-encoded audio data in response to the audio decoding timing data. The video decoding section decodes the compression-encoded video data in response to the video decoding timing data.

In one embodiment of the invention, the reproduction speed conversion apparatus further includes an audio video synchronization section for synchronizing a timing for reproducing the decoded audio data and a timing for reproducing the decoded video data with each other, in accordance with an audio time stamp representing a time for reproducing the decoded audio data and a video time stamp representing a time for reproducing the decoded video data. The video reproduction speed conversion section transmits a signal representing the reproduction speed obtained by the video reproduction speed conversion section to the audio video synchronization section. The audio video synchronization section generates audio decoded timing data representing a timing for decoding the compression-encoded audio data in response to the audio time stamp and the signal representing the reproduction speed obtained by the video reproduction speed conversion section. The audio video synchronization section generates video decoding timing data representing a timing for decoding the compression-encoded video data in response to the video time stamp and the signal representing the reproduction speed obtained by the video reproduction speed conversion section. The audio decoding section decodes the compression-encoded audio data in response to the audio decoding timing data. The video decoding section decodes the compression-encoded video data in response to the video decoding timing data.

In one embodiment of the invention, the reproduction speed conversion apparatus further includes a storage device for storing the compression-encoded audio data and the compression-encoded video data; and a data load device for loading the compression-encoded audio data and the compression-encoded video data from the storage device. The audio reproduction speed conversion section transmits a signal representing a reproduction speed obtained by the audio reproduction speed conversion section to the data load device. The data load device outputs the compression-encoded audio data loaded from the storage device to the audio decoding section, and outputs the compression-encoded video data loaded from the storage device to the video reproduction speed conversion section, in accordance with the signal transmitted from the audio reproduction speed conversion section.

In one embodiment of the invention, the reproduction speed conversion apparatus further includes a storage device for storing the compression-encoded audio data and the compression-encoded video data; and a data load device for loading the compression-encoded audio data and the compression-encoded video data from the storage device. The video reproduction speed conversion section transmits a signal representing a reproduction speed obtained by the video reproduction speed conversion section to the data load device. The data load device outputs the compression-encoded audio data loaded from the storage device to the audio decoding section, and outputs the compression-encoded video data loaded from the storage device to the video reproduction speed conversion section, in accordance with the signal transmitted from the video reproduction speed conversion section.

In one embodiment of the invention, the storage device stores the audio time stamp and the video time stamp. The data load device loads the audio time stamp and the video time stamp from the storage device. The data load device outputs the audio time stamp and the video time stamp loaded from the storage device to the audio video synchronization section.

In one embodiment of the invention, the storage device is a recording medium allowing for data recording and data reproduction, or a recording medium allowing only for data reproduction.

Thus, the invention described herein makes possible the advantages of providing a reproduction speed conversion apparatus for converting a reproduction speed of video data and a reproduction speed of audio data into a reproduction speed corresponding to a level lower than a requested level when reproduction speed conversion corresponding to the requested level is determined to be impossible.

These and other advantages of the present invention will become apparent to those skilled in the art upon reading and understanding the following detailed description with reference to the accompanying figures.

BRIEF DESCRIPTION OF DRAWINGS

FIG. 3 is a block diagram illustrating a structure of a reproduction speed conversion apparatus 300 according to a second example of the present invention;

DETAILED DESCRIPTION

Hereinafter, the present invention will be described by way of illustrative examples with reference to the accompanying FIGS. 1 through 4.

EXAMPLE 1

Figure 1:
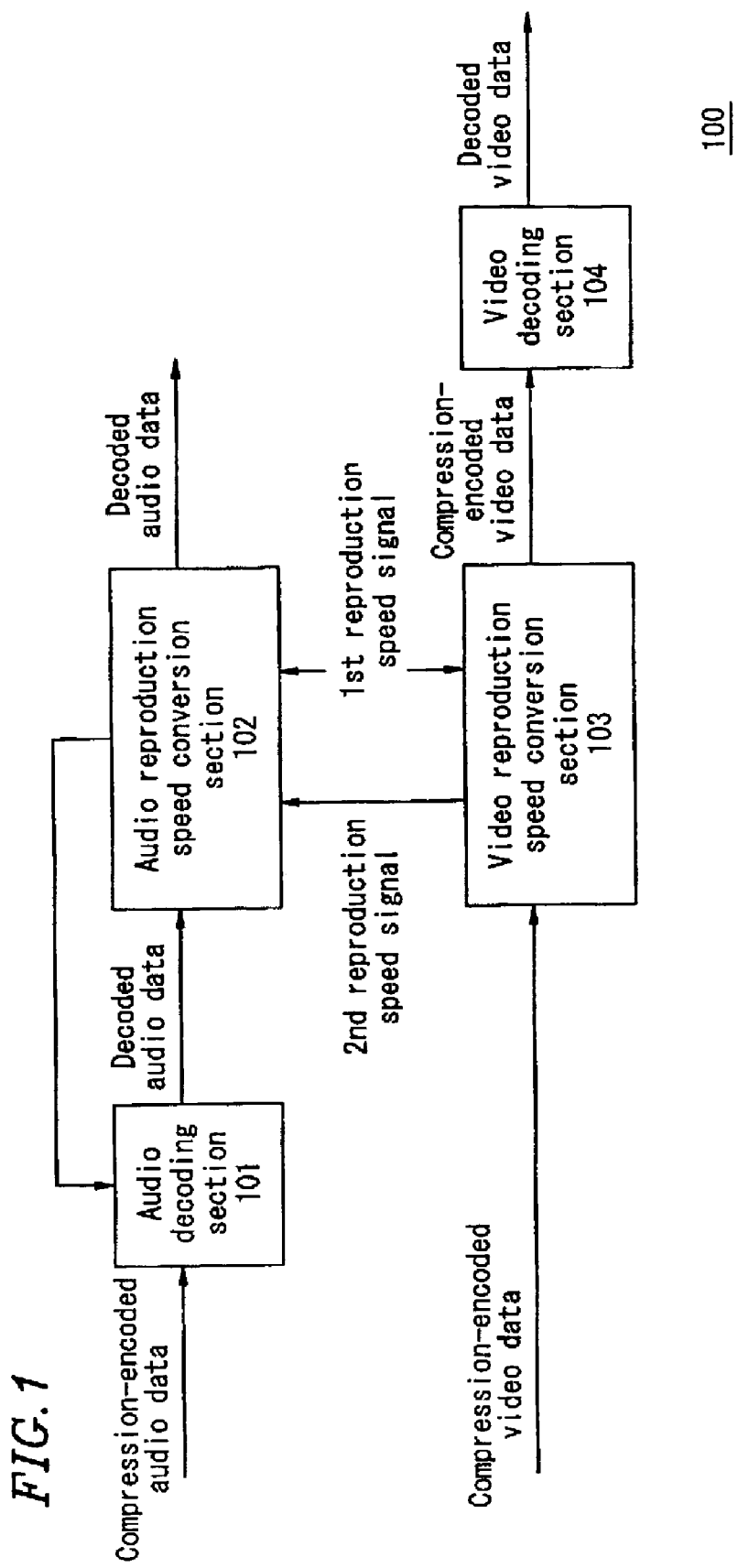
FIG. 1 is a block diagram illustrating a structure of a reproduction speed conversion apparatus 100 according to a first example of the present invention.

FIG. 1 shows a structure of a reproduction speed conversion apparatus 100 according to a first example of the present invention. The reproduction speed conversion apparatus 100 includes an audio decoding section 101, an audio reproduction speed conversion section 102, a video reproduction speed conversion section 103, and a video decoding section 104.

The reproduction speed conversion apparatus 100 converts a reproduction speed of compression-encoded audio data and a reproduction speed of compression-encoded video data into an identical reproduction speed. The compression-encoded audio data is audio data compression-encoded by, for example, the Dolby AC3 or dts system adopted by the DVD-Video Standard, the MPEG1-layer II adopted by the CS Digital Standard, the MPEG2-AAC system adopted by the BS Digital Standard, the MLP system adopted by the DVD-Audio Standard, or the MP3 (MPEG1-layer III) system commonly used on the Internet.

Hereinafter, an operation of the reproduction speed conversion apparatus 100 for converting a reproduction speed of compression-encoded audio data and a reproduction speed of compression-encoded video data in compliance with the MPEG Standards to an identical reproduction speed will be described.

The audio decoding section 101 receives compression-encoded audio data. The audio decoding section 101 decodes the compression-encoded audio data so as to output the decoded audio data to the audio reproduction speed conversion section 102.

The audio reproduction speed conversion section 102 receives the decoded audio data output from the audio decoding section 101. When a user requests a reproduction speed $N_1$ times the original speed, a reproduction speed signal representing a requested level of the reproduction speed $N_1$ times the original speed requested by the user (first reproduction speed signal) is input to the audio reproduction speed conversion section 102.

For example, the user generates the reproduction speed signal representing the requested level of the reproduction speed $N_1$ times the original speed (first reproduction speed signal) using a remote control (not shown) provided outside the reproduction speed conversion apparatus 100. The user operates the remote control to input the reproduction speed signal to the audio reproduction speed conversion section 102.

Alternatively, the user selects the reproduction speed signal representing the requested level of the reproduction speed $N_1$ times the original speed (first reproduction speed signal) by pushing a button (not shown) provided on the reproduction speed conversion apparatus 100. The user further pushes the button to input the reproduction speed signal to the audio reproduction speed conversion section 102.

In response to the reproduction speed signal, the audio reproduction speed conversion section 102 converts the reproduction speed of the decoded audio data into a reproduction speed $N_1$ times the original speed.

The audio reproduction speed conversion section 102 uses, for example, the Pointer Interval Controlled OverLap and Add (PICOLA) system to convert the reproduction speed of the audio data. The PICOLA system thins out repeated-waveform portions from audio data so as to compress the audio data.

The audio reproduction speed conversion section 102 outputs a reproduction speed signal representing the reproduction speed obtained by the audio reproduction speed conversion section 102, i.e., the reproduction speed $N_1$ times the original reproduction speed, to the audio decoding signal 101. The audio reproduction speed conversion section 102 outputs the decoded audio data having the reproduction speed $N_1$ times the original speed.

The audio reproduction speed conversion section 102 may use the OverLap and Add (OLA) system or the Synchronized OverLap and Add (SOLA) system, instead of the PICOLA system, to convert the reproduction speed of the audio data.

The OLA system compresses or extends audio data by cross-fading a plurality of pieces of frame data which are adjacent to each other at a certain time interval.

The SOLA system compresses or extends audio data with high quality by calculating the correlation between a plurality of pieces of frame data which are adjacent to each other at a certain time interval, shifting the plurality of pieces of such frame data to portions having the highest level of correlation and cross-fading the plurality of pieces of such frame data.

The video reproduction speed conversion section 103 receives compression-encoded video data in compliance with the MPEG Standards. The compression-encoded video data contains specific video data, for example, B-Picture, which is differential video data in compliance with the MPEG Standards. The video reproduction speed conversion section 103 thins out the B-Picture so as to convert the reproduction speed of the compression-encoded video data.

The video reproduction speed conversion section 103 outputs the compression-encoded video data having the converted reproduction speed to the video decoding section 104.

The functions of the video reproduction speed conversion section 103 will be described later in detail.

The video decoding section 104 decodes the compression-encoded video data and then outputs the decoded audio data.

The video reproduction speed conversion section 103 thins out the B-Picture before the video data is decoded. In this manner, the quantity of data to be thinned out is smaller than that by thinning out the B-Picture after the video data is decoded.

Hereinafter, the functions of the video reproduction speed conversion section 103 will be described in detail.

The video reproduction speed conversion section 103 receives a reproduction speed signal representing a requested level of the reproduction speed $N_1$ times the original speed requested by the user (first reproduction speed signal).

The reproduction speed signal is input to the audio reproduction speed conversion section 102 and the video reproduction speed conversion section 103. The reproduction speed signal may be separately input to the audio reproduction speed conversion section 102 and the video reproduction speed conversion section 103. Alternatively, the reproduction speed signal may be first input to the audio reproduction speed conversion section 102 and then forwarded to the video reproduction speed conversion section 103.

The video reproduction speed conversion section 103 determines whether the reproduction speed of the compression-encoded video data can be converted into the reproduction speed $N_1$ times the original speed (YES) or not (NO).

The video reproduction speed conversion section 103 performs above-mentioned determination depending on whether the ratio at which the B-Picture appears in the compression-encoded video data is larger than a threshold value determined in accordance with the requested level, or not.

Hereinafter, it is assumed that the video reproduction speed conversion section 103 has a threshold value $C_1$, for the reproduction speed $N_1$ times the original speed.

When the ratio at which the B-Picture appears in the compression-encoded video data is larger than or equal to the threshold value $C_1$, the video reproduction speed conversion section 103 determines YES. The video reproduction speed conversion section 103 thins out the B-Picture so as to convert the reproduction speed of the compression-encoded video data into the reproduction speed $N_1$ times the original speed.

When the ratio at which the B-Picture appears in the compression-encoded video data is smaller than to the threshold value $C_1$, the video reproduction speed conversion section 103 determines NO. In this case, the video reproduction speed conversion section 103 thins out the B-Picture so as to convert the reproduction speed of the compression-encoded video data into a reproduction speed $N_2$ times the original speed, which corresponds to a prescribed level lower than the requested level. The video reproduction speed conversion section 103 also outputs a reproduction speed signal representing the prescribed level (second reproduction speed signal) to the audio reproduction speed conversion section 102. The audio reproduction speed conversion section 102 ignores the first reproduction speed signal and follows the second reproduction speed signal which is output from the video reproduction speed conversion section 103. The audio reproduction speed conversion section 102 also outputs a signal representing the reproduction speed obtained by the audio reproduction speed conversion section 102, i.e., the reproduction speed 1.2 times the original reproduction speed.

In the above example, $N_1=1.4$ and $N_2=1.2$, for example. The factor by which the reproduction speed can be converted is not limited to these values. The factor by which the reproduction speed can be converted, and the threshold value, are arbitrary as long as $N_1>N_2$.

The video reproduction speed conversion section 103 may have a plurality of threshold values C for reproduction speeds corresponding to a plurality of requested levels.

Now, it is assumed that the video reproduction speed conversion section 103 has a threshold value $C_1$ for the reproduction speed $N_1$ times the original speed, a threshold value$_2$ for the reproduction speed $N_2$ times the original speed, and a threshold value $C_3$ for the reproduction speed $N_3$ times the original speed.

When the ratio at which the B-Picture appears in the compression-encoded video data is larger than or equal to the threshold value $C_1$, the video reproduction speed conversion section 103 determines YES. The video reproduction speed conversion section 103 thins out the B-Picture so as to convert the reproduction speed of the compression-encoded video data into the reproduction speed $N_1$ times the original speed.

When the ratio at which the B-Picture appears in the compression-encoded video data is smaller than the threshold value $C_1$, the video reproduction speed conversion section 103 determines NO.

In this case, the video reproduction speed conversion section 103 determines whether or not the ratio at which the B-Picture appears in the compression-encoded video data is larger than or equal to the threshold value $C_2$. When the ratio is larger than or equal to the threshold value $C_2$, the video reproduction speed conversion section 103 determines YES. The video reproduction speed conversion section 103 thins out the B-Picture so as to convert the reproduction speed of the compression-encoded video data into the reproduction speed $N_2$ times the original speed.

When the ratio at which the B-Picture appears in the compression-encoded video data is smaller than the threshold value $C_2$, the video reproduction speed conversion section 103 determines NO.

In this case, the video reproduction speed conversion section 103 determines whether or not the ratio at which the B-Picture appears in the compression-encoded video data is larger than or equal to the threshold value $C_3$. When the ratio is larger than or equal to the threshold value $C_3$, the video reproduction speed conversion section 103 determines YES. The video reproduction speed conversion section 103 thins out the B-Picture so as to convert the reproduction speed of the compression-encoded video data into the reproduction speed $N_3$ times the original speed.

As described above, when a reproduction speed of compression-encoded video data cannot be converted into a reproduction speed corresponding to the requested level, the video reproduction speed conversion section 103 determines whether or not the reproduction speed can be converted into a reproduction speed corresponding to a lower level. When it is impossible (NO), the video reproduction speed conversion section 103 determines whether or not the reproduction speed can be converted into a reproduction speed corresponding to a still lower level. Thus, the video reproduction speed conversion section 103 converts the reproduction speed of compression-encoded video data into a reproduction speed corresponding to a level as close as possible to the requested level.

In the above example, $N_1=1.4$, $N_2=1.2$, and $N_3=1.0$, for example. The factor by which the reproduction speed can be converted is not limited to these values. The factor by which the reproduction speed can be converted, and the threshold value, are arbitrary as long as $N_1>N_2>N_3$ and $C_1>C_2>C_3$. The number of the factor by which the reproduction speed can be converted is not limited to three. As long as $N_1 > \ldots N_m$ and $C_1 > \ldots > C_m$, m may be any integer of 2 or greater.

In the above example, the video reproduction speed conversion section 103 converts the reproduction speed of video data by thinning out the B-Picture.

The video data to be thinned out is not limited to B-Picture, and may be any data which can be estimated and produced based on both future video data and past video data.

Alternatively, video data which is estimated and produced based on only past video data may be thinned out. Such video data is, for example, P-Picture.

Video data to be thinned out according to the present invention may be any type of time-compression-encoded video data, such as, for example, video data estimated and produced based on both future video data and past video data, or video data estimated and produced based on only past video data.

The reproduction speed conversion apparatus 100 may further have a function of preventing the determination on whether the ratio at which the B-Picture appears is larger than a threshold value or not. In this case, the reproduction speed conversion apparatus 100 can convert a reproduction speed of data which is not a target of determination on the possibility of conversion into a reproduction speed corresponding to a requested level.

In the case of, for example, a DVD-Video slideshow with voice, input data does not include B-Picture or P-Picture. However, when the reproduction speed conversion apparatus senses that the DVD Video slideshow with voice is reproduced, a function of preventing the determination on whether the ratio at which the B-Picture appears is larger than a threshold value or not is carried out, for example. Thus, a reproduction speed of the input data is converted into a reproduction speed corresponding to the requested level. In the case where the input data includes only audio data without any video data, a similar function is carried out, for example. Thus, a reproduction speed of the input data is converted into a reproduction speed corresponding to the requested level.

In the case where it is determined that the conversion into a reproduction speed corresponding to the requested level is impossible and then conversion into another reproduction speed corresponding to a prescribed level lower than the requested level is performed, the video reproduction speed conversion section may intermittently determine the ratio at which the B-Picture appears in the compression-encoded video data. By intermittently determining the ratio, when the ratio exceeds the threshold value and it is determined that the conversion into a reproduction speed corresponding to the requested level is possible, such conversion can be performed.

In the case where a reproduction speed is converted into a reproduction speed corresponding to the requested level and into reproduction speed corresponding to a prescribed level lower than the requested level alternately a plurality of times, the reproduction speed may be converted into only the reproduction speed corresponding to the prescribed level.

As described above, when conversion into a reproduction speed corresponding to a requested level is determined to be impossible, the reproduction speed conversion apparatus in the first example converts a reproduction speed of video data and a reproduction speed of audio data into a reproduction speed corresponding to a prescribed level lower than the requested level. Owing to such a structure, even when conversion into a reproduction speed corresponding to a requested level is impossible, a reproduction speed of video data and a reproduction speed of audio data are converted into an identical reproduction speed. As a result, reproduction of the video data is prevented from being delayed with respect to reproduction of the audio data.

In the above example, the reproduction speed conversion apparatus 100 converts a reproduction speed of compression-encoded audio data and a reproduction speed of video data in compliance with the MPEG Standards into an identical reproduction speed.

The compression-encoded audio data and the compression-encoded video data may be loaded from a storage device to a data load device.

Figure 2:
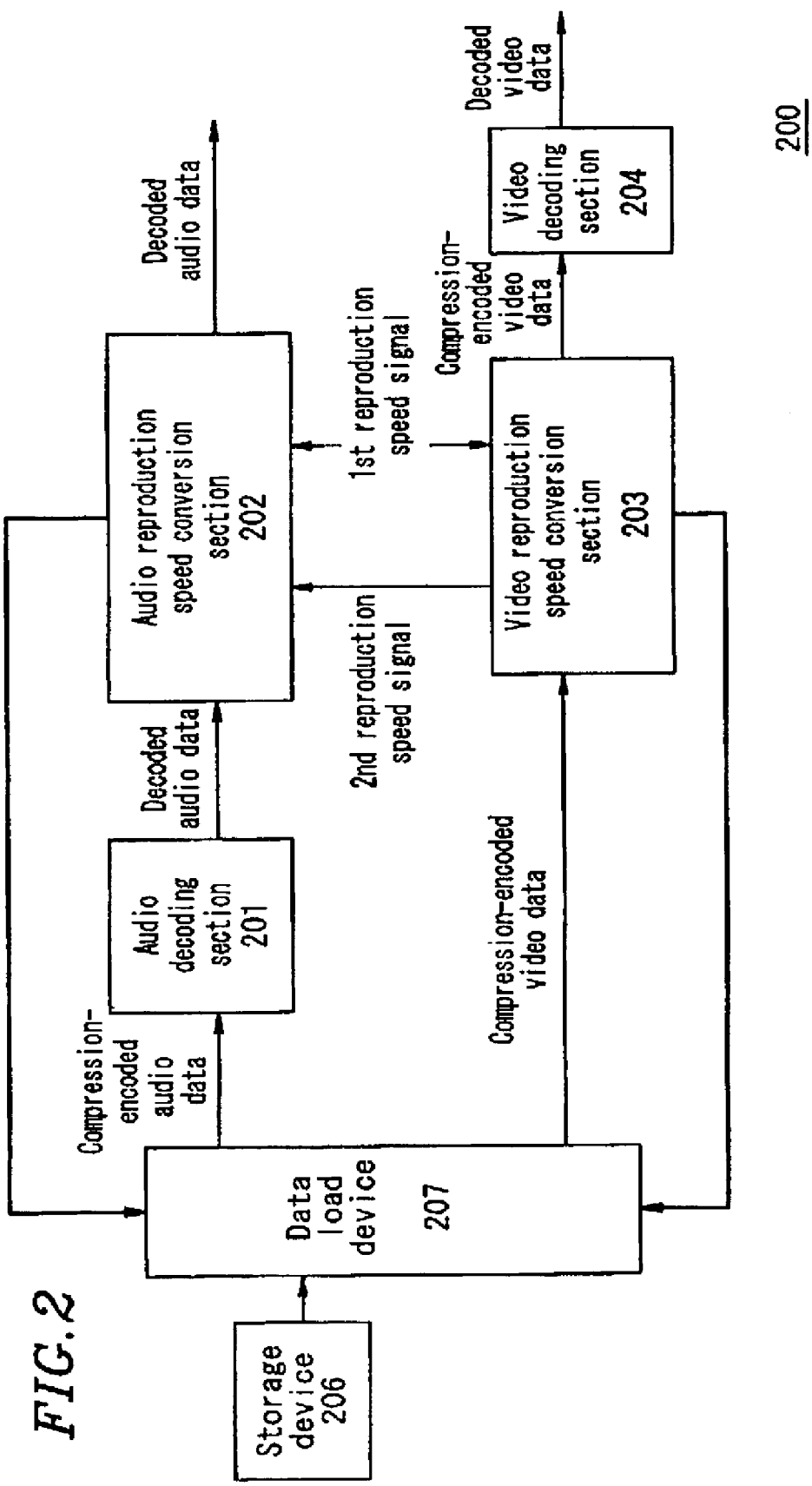
FIG. 2 is a block diagram illustrating a structure of another reproduction speed conversion apparatus 200 according to the first example of the present invention.

FIG. 2 shows a structure of another reproduction speed conversion apparatus 200 according to the first example of the present invention. The reproduction speed conversion apparatus 200 includes a storage device 206 and a data load device 207 in addition to the elements included in the reproduction speed conversion apparatus 100.

The storage device 206 stores compression-encoded audio data and compression-encoded video data in compliance with the MPEG Standards. The compression-encoded audio data and the compression-encoded video data are loaded from the storage device 206 to the data load device 207.

An audio decoding section 201 receives compression-encoded audio data loaded from the storage device 206.

A video reproduction speed conversion section 203 receives the compression-encoded video data in compliance with the MPEG Standards loaded from the storage device 206. The compression-encoded video data contains specific video data, for example, B-Picture, which is differential video data in compliance with the MPEG Standards.

The audio decoding section 201 functions identically to the audio decoding section 101. A video decoding section 204 functions identically to the video decoding section 104. An audio reproduction speed conversion section 202 functions identically to the audio reproduction speed conversion section 102 except that the former sends a signal representing a reproduction speed obtained by the audio reproduction speed conversion section 202 to the data load device 207. The video reproduction speed conversion section 203 functions identically to the video reproduction speed conversion section 103 except that the former sends a signal representing a reproduction speed obtained by the video reproduction speed conversion section 203 to the data load device 207.

The data load device 207 receives a signal representing the reproduction speed obtained by the video reproduction speed conversion section 203. The signal is sent from the video reproduction speed conversion section 203. In accordance with this signal, the data load device 207 loads the compression-encoded audio data and the compression-encoded video data from the storage device 206. Thus, the quantity of the compression-encoded audio data and the compression-encoded video data which are output from the data load device 207 are not in excess or insufficient even when the reproduction speed of the decoded audio data and the reproduction speed of the compression-encoded video data are converted.

The data load device 207 may receive a signal representing a reproduction speed obtained by the audio reproduction speed conversion section 202 sent from the audio reproduction speed conversion section 202, instead of the signal representing the reproduction speed obtained by the video reproduction speed conversion section 203 sent from the video reproduction speed conversion section 203. In this case also, in accordance with the signal, the data load device 207 loads the compression-encoded audio data and the compression-encoded video data from the storage device 206. Thus, the quantity of the compression-encoded audio data and the compression-encoded video data which are output from the data load device 207 are not in excess or insufficient.

As described above, a reproduction speed conversion apparatus according to the first example loads compression-encoded audio data and compression-encoded video data from the storage device to the data load device, such that the quantity of the compression-encoded audio data and the compression-encoded video data which are output from the data load device is not in excess or insufficient. As a result, even when the reproduction speed is changed from a reproduction speed corresponding to a requested level to a reproduction speed corresponding to a prescribed level lower than the requested level, the data load device can load compression-encoded audio data and compression-encoded video data from the storage device without making the quantity of the compression-encoded audio data and the compression-encoded video data which are output from the data load device in excess or insufficient.

A network may be interposed among the audio decoding section 201, video reproduction speed conversion section 203, and the data load device 207. In this case, the storage device 206 is, for example, an accumulation media in a server on the transmitting end.

The reproduction speed conversion apparatus 200 in FIG. 2 may be on the transmitting end.

The storage device 206 is, for example, a recording medium allowing for data recording and data reproduction, or a recording medium allowing only for data reproduction.

The recording medium allowing for data recording and data reproduction is, for example, a CD-R, CD-RW, DVD-RAM, DVD-R, DVD-RW, DVD+R or DVD+RW disc.

The recording medium allowing only for data reproduction is, for example, a DVD-Video disc or a CD.

The data load device 207 may include a de-multiplexer. When multiplexed data obtained by multiplexing compression-encoded audio data and compression-encoded video data is stored in the storage device 206, the de-multiplexer separates the multiplexed data into the compression-encoded audio data and the compression-encoded video data. The data load device 207 outputs the compression-encoded audio data to the audio decoding section 201, and outputs the compression-encoded video data to the video reproduction speed conversion section 203.

EXAMPLE 2

Figure 3:
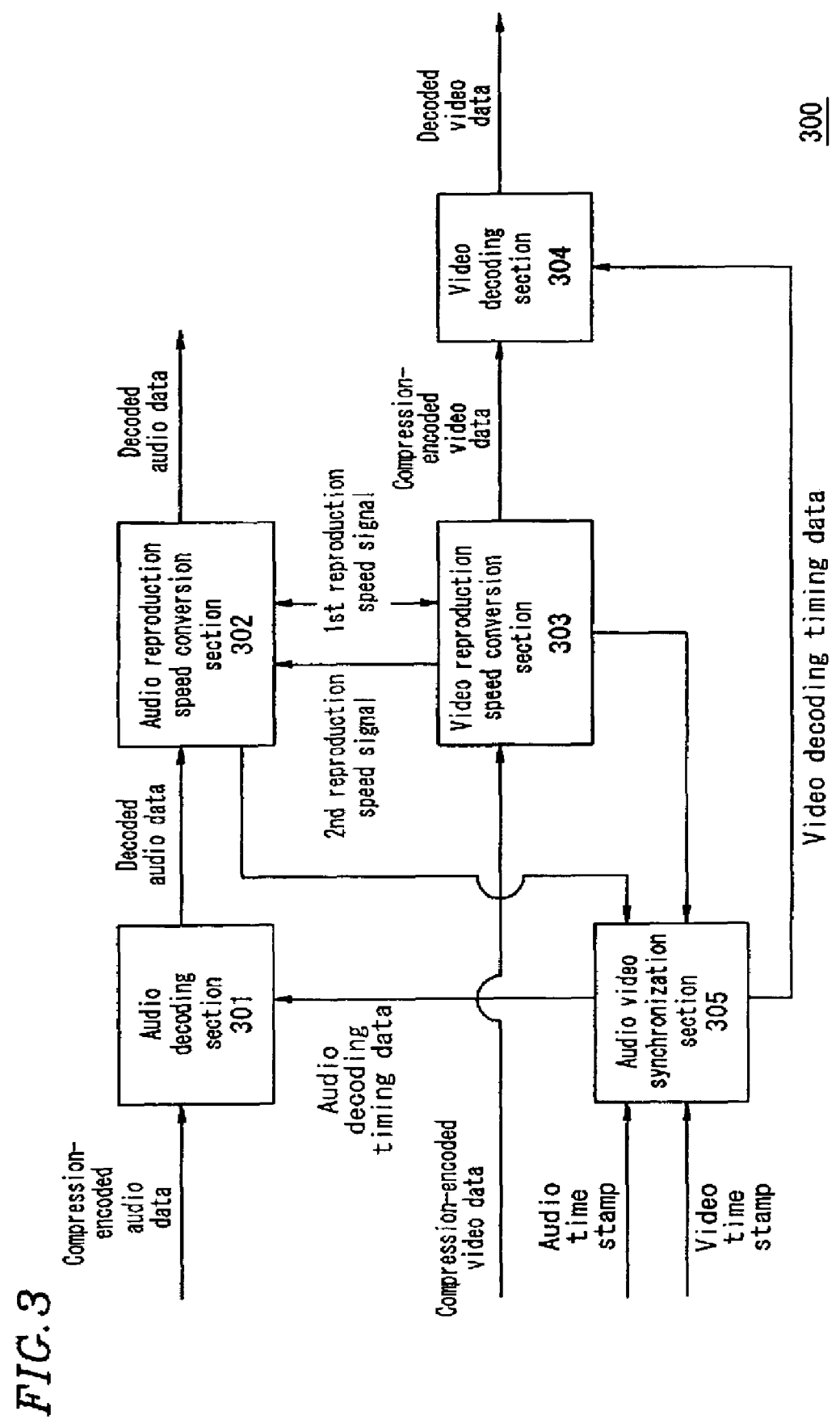

FIG. 3 shows a structure of a reproduction speed conversion apparatus 300 according to a second example of the present invention. The reproduction speed conversion apparatus 300 includes an audio decoding section 301, an audio reproduction speed conversion section 302, a video reproduction speed conversion section 303, a video decoding section 304, and an audio video synchronization section 305. The reproduction speed conversion apparatus 300 has the same structure as that of the reproduction speed conversion apparatus 100 except that the former includes the audio video synchronization section 305.

The reproduction speed conversion apparatus 300 converts a reproduction speed of compression-encoded audio data and a reproduction speed of compression-encoded video data into an identical reproduction speed. The compression-encoded audio data is audio data compression-encoded by, for example, the Dolby AC3 or dts system adopted by the DVD-Video Standard, the MPEG1-layer II system adopted by the CS Digital Standard, the MPEG2-AAC system adopted by the BS Digital Standard, the MLP system adopted by the DVD-Audio Standard, or the MP3 (MPEG1-layer III) system commonly used on the Internet.

Hereinafter, an operation of the reproduction speed conversion apparatus 300 for converting a reproduction speed of compression-encoded audio data and a reproduction speed of compression-encoded video data in compliance with the MPEG Standards to an identical reproduction speed will be described.

The audio decoding section 301 receives compression-encoded audio data. The audio decoding section 301 decodes the compression-encoded audio data in response to audio decoding timing data which represents a timing for decoding the compression-encoded audio data. Thus, the audio decoding section 301 outputs the decoded audio data to the audio reproduction speed conversion section 302. The audio decoding timing data is output from the audio video synchronization section 305.

The functions of the audio video synchronization section 305 will be described later in detail.

The audio reproduction speed conversion section 302 receives the decoded audio data output from the audio decoding section 301. When a user requests a reproduction speed $N_1$ times the original speed, a reproduction speed signal representing a requested level of the reproduction speed $N_1$ times the original speed requested by the user (first reproduction speed signal) is input to the audio reproduction speed conversion section 302. In response to the reproduction speed signal, the audio reproduction speed conversion section 302 converts the reproduction speed of the decoded audio data into a reproduction speed $N_1$ times the original speed, and also sends a signal representing the reproduction speed obtained by the audio reproduction speed conversion section 302 to the audio video synchronization section 305.

The audio reproduction speed conversion section 302 uses, for example, the PICOLA system to convert the reproduction speed of the audio data.

The audio reproduction speed conversion section 302 may use the OLA system or the SOLA system, instead of the PICOLA system to convert the reproduction speed of the audio data.

The video reproduction speed conversion section 303 receives compression-encoded video data in compliance with the MPEG Standards. The compression-encoded video data contains specific video data, for example, B-Picture, which is differential video data in compliance with the MPEG Standards. The video reproduction speed conversion section 303 thins out the B-Picture so as to convert the reproduction speed of the compression-encoded video data. As described above, the functions of the video reproduction speed conversion section 303 are the same as those of the video reproduction speed conversion section 103.

The video reproduction speed conversion section 303 outputs the compression-encoded video data having the converted reproduction speed to the video decoding section 304.

The video decoding section 304 decodes the compression-encoded video data in response to video decoding timing data which represents a timing for decoding the compression-encoded video data, and thus outputs the decoded audio data. The video decoding timing data is output from the audio video synchronization section 305.

Before an audio reproduction speed conversion section converts a reproduction speed of audio data, a plurality of audio time stamps are provided at a certain time interval. After the audio reproduction speed conversion section converts the reproduction speed of the audio data, the plurality of audio time stamps are provided at different time intervals. The reason is that in general, audio data is partially compressed or extended but not uniformly compressed or extended. This is true with the PICOLA system, the OLA system, and the SOLA system. The audio data after the reproduction speed is converted is not necessarily reproduced at a constant speed. Locally, the reproduction speed of such audio data is frequently changed. The audio video synchronization section broadly considers the audio data after the reproduction speed is converted, and synchronizes the timing for reproducing the video data and the timing for reproducing the audio data with each other.

Hereinafter, the functions of the audio video synchronization section 305 will be described in detail.

The audio video synchronization section 305 receives an audio time stamp which represents a time for reproducing the decoded audio data and a video time stamp which represents a time for reproducing the decoded video data.

In accordance with the audio time stamp and the video time stamp, the audio video synchronization section 305 synchronizes the timing for reproducing the decoded video data and the timing for reproducing the decoded audio data with each other. When, for example, the timing for reproducing the decoded video data is delayed with respect to the timing for reproducing the decoded audio data, reproduction of a certain quantity of video data is skipped. Thus, the timing for reproducing the decoded video data can be synchronized with the timing for reproducing the decoded audio data. When, for example, the timing for reproducing the decoded video data is advanced with respect to the timing for reproducing the decoded audio data, a certain quantity of video data is reproduced in repetition. Thus, the timing for reproducing the decoded video data can be synchronized with the timing for reproducing the decoded audio data.

The audio video synchronization section 305 receives a signal representing the reproduction speed obtained by the audio reproduction speed conversion section 302. The signal is sent from the audio reproduction speed conversion section 302.

In response to the audio reproduction data and the signal representing the reproduction speed obtained by the audio reproduction speed conversion section 302, the audio video synchronization section 305 generates audio decoding timing data. As described above, the audio decoding section 301 decodes the compression-encoded audio data in response to the audio decoding timing data.

In response to the video reproduction data and the signal representing the reproduction speed obtained by the audio reproduction speed conversion section 302, the audio video synchronization section 305 generates video decoding timing data. As described above, the video decoding section 304 decodes the compression-encoded video data in response to the video decoding timing data.

The audio video synchronization section 305 may receive a signal representing a reproduction speed obtained by the video reproduction speed conversion section 303 sent from the video reproduction speed conversion section 303, instead of the signal representing the reproduction speed obtained by the audio reproduction speed conversion section 302 sent from the audio reproduction speed conversion section 302.

In this case, upon receipt of the audio time stamp and the signal representing the reproduction speed obtained by the video reproduction speed conversion section 303, the audio video synchronization section 305 generates audio decoding timing data. As described above, upon receipt of the audio decoding timing data, the audio decoding section 301 the compression-encoded audio data. Upon receipt of the video time stamp and the signal representing the reproduction speed obtained by the video reproduction speed conversion section 303, the audio video synchronization section 305 generates video decoding timing data. As described above, upon receipt of the video decoding timing data, the video decoding section 304 decodes the compression-encoded video data.

The functions of the audio video synchronization section 305 are as described above.

As described above, in a reproduction speed conversion apparatus according to the second example, the audio video synchronization section synchronizes the timing for reproducing decoded video data and the timing for reproducing decoded audio data with each other. Thus, even when the reproduction speed is changed from a reproduction speed corresponding to the requested level to a reproduction speed corresponding to a prescribed level lower than the requested level, the timing for reproducing the video data and the timing for reproducing the audio data can be synchronized with each other. As a result, even when the reproduction speed is thus changed, the timing for reproducing the video data and the timing for reproducing the audio data are prevented from being offset with respect to each other.

In the above example, the reproduction speed conversion apparatus 300 converts a reproduction speed of compression-encoded audio data and a reproduction speed of video data in compliance with the MPEG Standards into an identical reproduction speed.

The compression-encoded audio data, the compression-encoded video data, the audio time stamp, and the video time stamp may be loaded from a storage device to a data load device.

Figure 4:
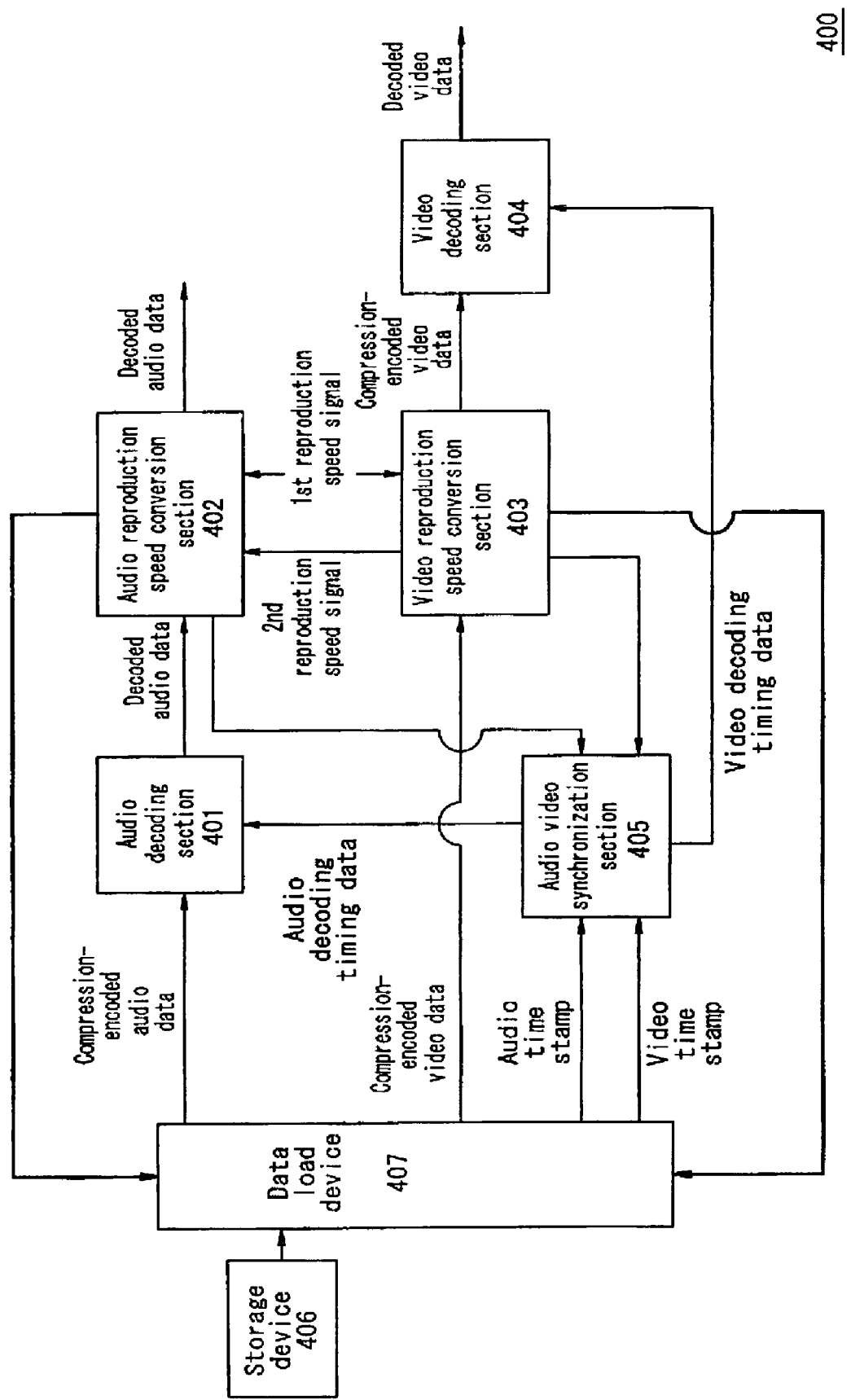
FIG. 4 is a block diagram illustrating a structure of another reproduction speed conversion apparatus 400 according to the second example of the present invention.
Figure 5:
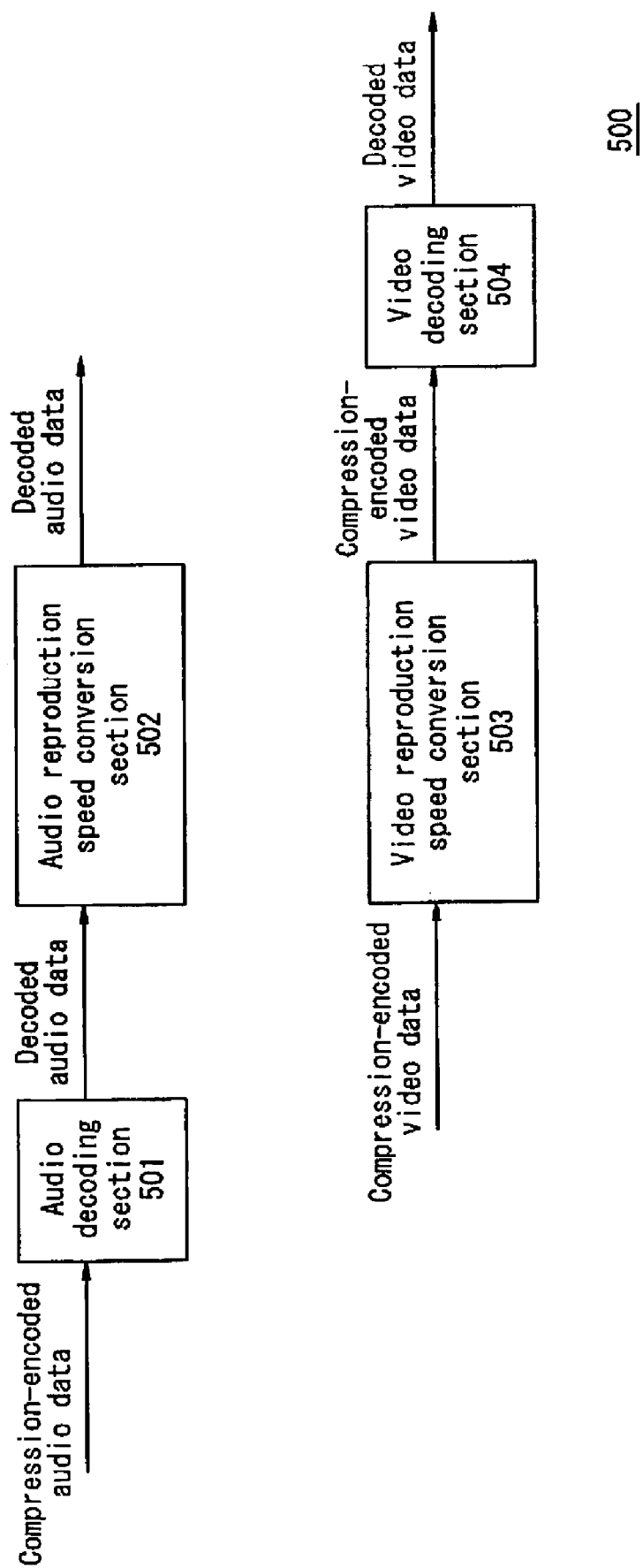
FIG. 5 is a block diagram illustrating a structure of a conventional reproduction speed conversion apparatus 500.
Figure 6:
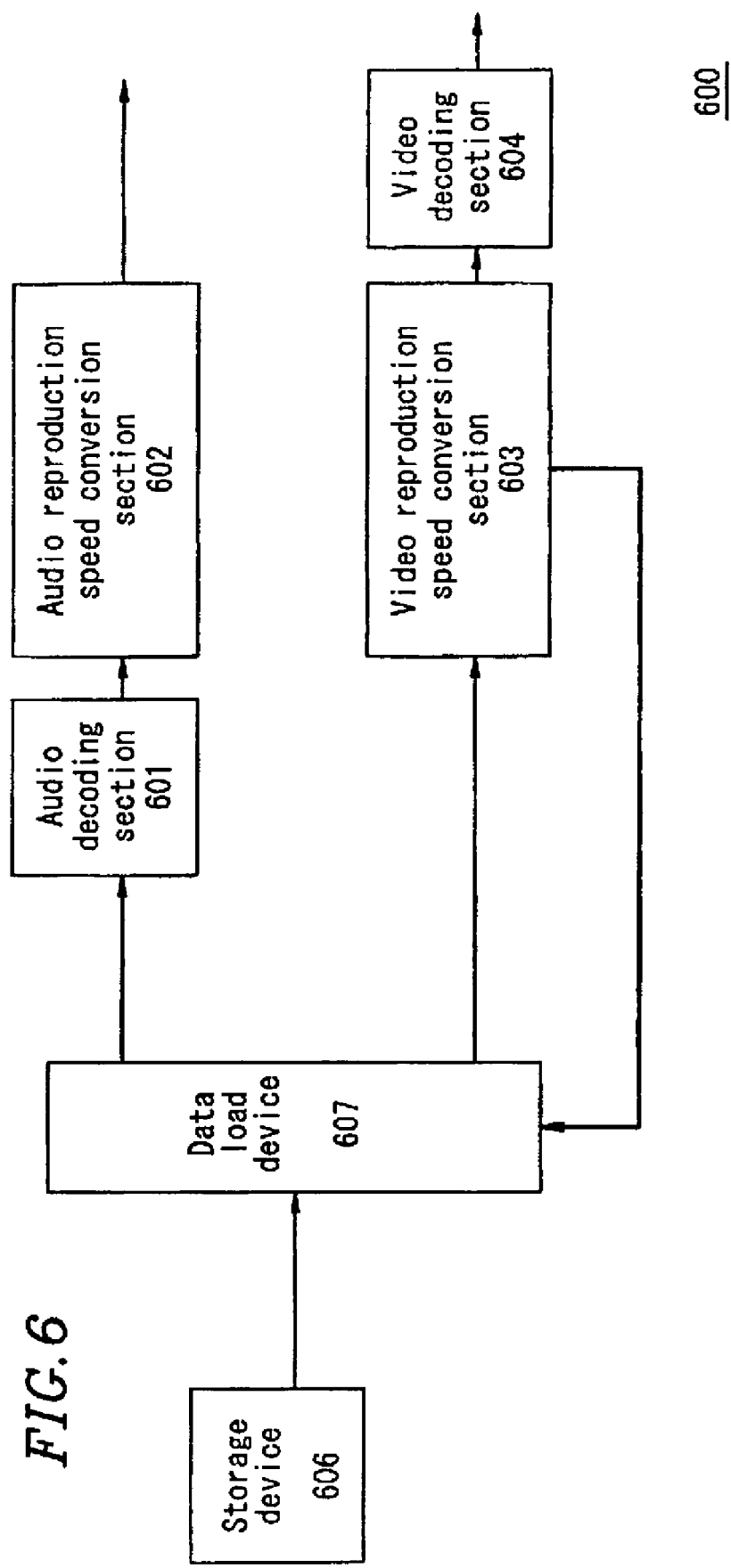
FIG. 6 is a block diagram illustrating a structure of another conventional reproduction speed conversion apparatus 600.
Figure 7:
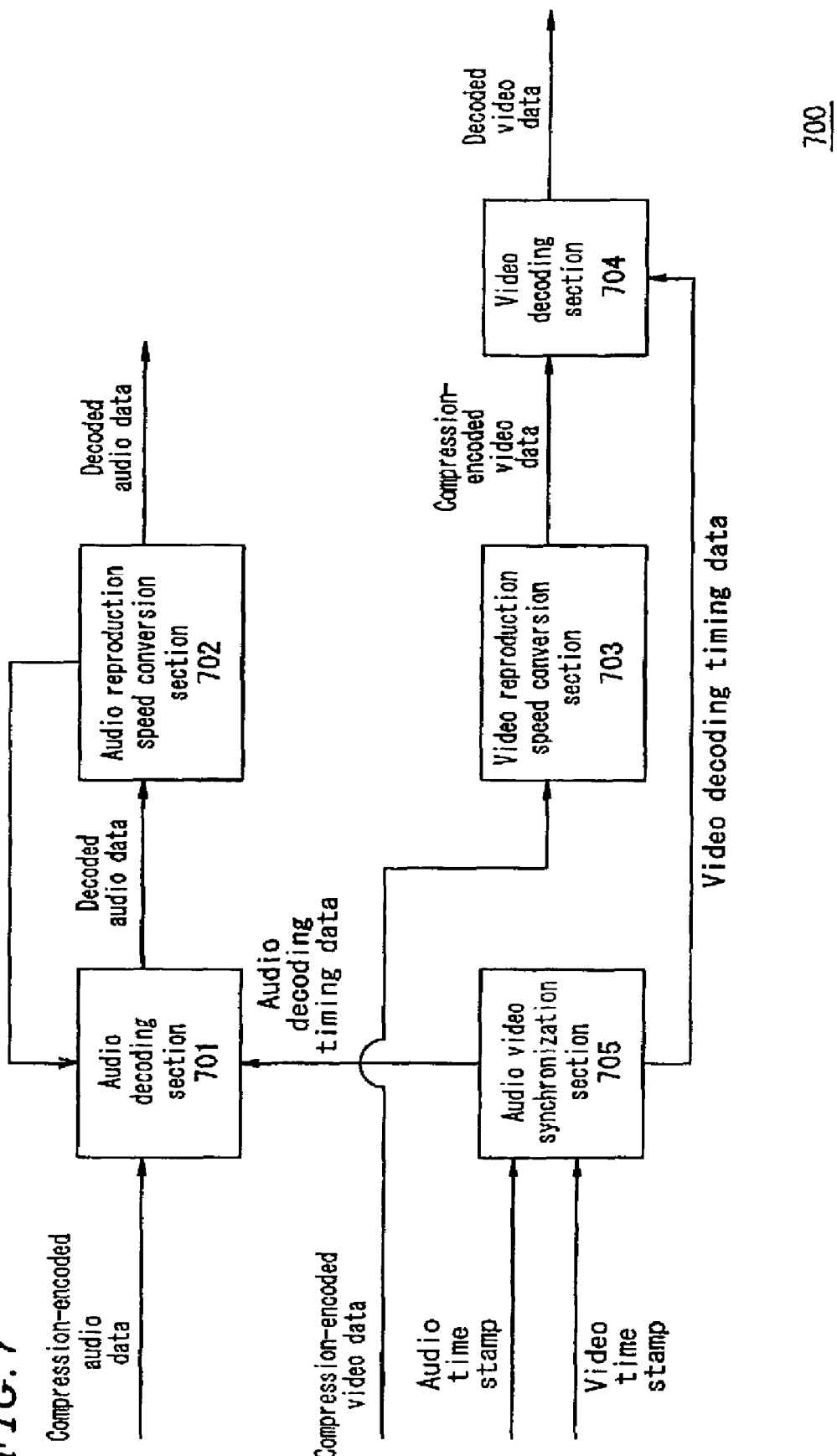
FIG. 7 is a block diagram illustrating a structure of still another conventional reproduction speed conversion apparatus 700.
Figure 8:
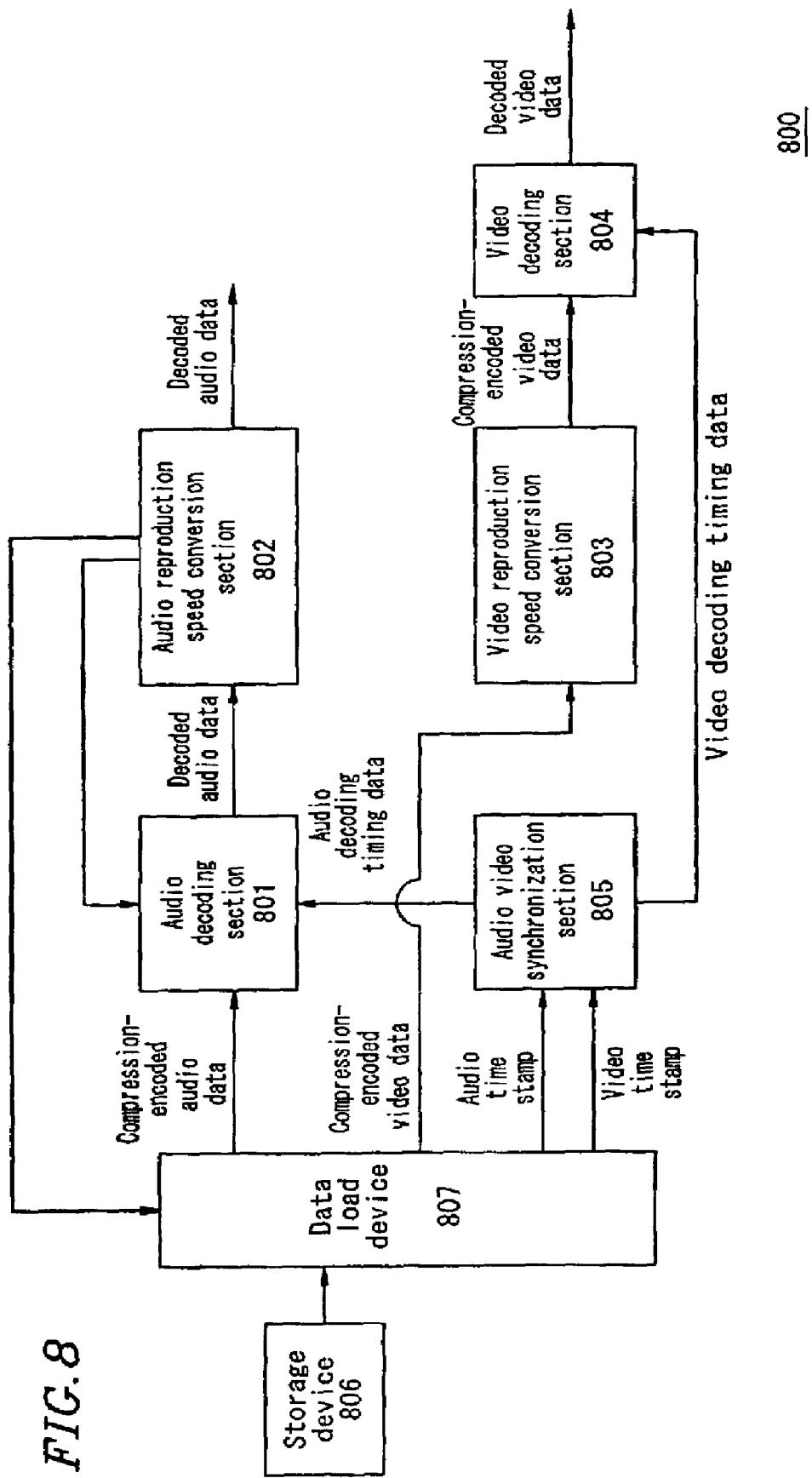
FIG. 8 is a block diagram illustrating a structure of still another conventional reproduction speed conversion apparatus 800.

FIG. 4 shows a structure of another reproduction speed conversion apparatus 400 according to the second example of the present invention. The reproduction speed conversion apparatus 400 includes a storage device 406 and a data load device 407 in addition to the elements included in the reproduction speed conversion apparatus 300.

The storage device 406 stores compression-encoded audio data, compression-encoded video data in compliance with the MPEG Standards, an audio time stamp, and a video time stamp. The compression-encoded audio data, the compression-encoded video data, the audio time stamp, and the video time stamp are loaded from the storage device 406 to the data load device 407.

An audio decoding section 401 receives compression-encoded audio data loaded from the storage device 406.

A video reproduction speed conversion section 403 receives the compression-encoded video data in compliance with the MPEG Standards loaded from the storage device 406. The compression-encoded video data contains specific video data, for example, B-Picture, which is differential video data in compliance with the MPEG Standards.

An audio video synchronization section 405 receives the audio time stamp and the video time stamp loaded from the storage device 406.

The audio decoding section 401 functions identically to the audio decoding section 301. A video decoding section 404 functions identically to the video decoding section 304. The audio video synchronization section 405 functions identically to the audio video synchronization section 305. An audio reproduction speed conversion section 402 functions identically to the audio reproduction speed conversion section 302 except that the former sends a signal representing a reproduction speed obtained by the audio reproduction speed conversion section 402 to the data load device 407. The video reproduction speed conversion section 403 functions identically to the video reproduction speed conversion section 303 except that the former sends a signal representing a reproduction speed obtained by the video reproduction speed conversion section 403 to the data load device 407.

The data load device 407 receives a signal representing the reproduction speed obtained by the audio reproduction speed conversion section 402. The signal is sent from the audio reproduction speed conversion section 402. In accordance with this signal, the data load device 407 loads the compression-encoded audio data, the compression-encoded video data, the audio time stamp, and the video time stamp from the storage device 406. Thus, the quantity of the compression-encoded audio data, the compression-encoded video data, the audio time stamp, and the video time stamp which are output from the data load device 407 are not in excess or insufficient even when the reproduction speed of the decoded audio data and the reproduction speed of the compression-encoded video data are converted.

In the case where a reproduction speed conversion apparatus includes an audio video synchronization section, the data load device preferably loads compression-encoded audio data, compression-encoded video data, an audio time stamp, and a video time stamp from the storage device in accordance with a signal representing the reproduction speed obtained by the audio reproduction speed conversion section. The reason is that the audio video synchronization section synchronizes the timing for reproducing the decoded video data and the timing for reproducing the decoded audio data with each other, in accordance with the signal representing the reproduction speed obtained by the audio reproduction speed conversion section.

The data load device 407 may receive a signal representing a reproduction speed obtained by the video reproduction speed conversion section 403 sent from the video reproduction speed conversion section 403, instead of the signal representing the reproduction speed obtained by the audio reproduction speed conversion section 402 sent from the audio reproduction speed conversion section 402. In this case also, in accordance with the signal, the data load device 407 loads the compression-encoded audio data, the compression-encoded video data, the audio time stamp, and the video time stamp from the storage device 406. Thus, the quantity of the compression-encoded audio data, the compression-encoded video data, the audio time stamp, and the video time stamp which are output from the data load device 407 are not in excess or insufficient.

As described above, a reproduction speed conversion apparatus according to the second example loads compression-encoded audio data, compression-encoded video data, an audio time stamp, and a video time stamp from the storage device to the data load device, such that the quantity of the compression-encoded audio data, the compression-encoded video data, the audio time stamp, and the video time stamp which are output from the data load device is not in excess or insufficient. As a result, even when the reproduction speed is changed from a reproduction speed corresponding to the requested level to a reproduction speed corresponding to a prescribed level lower than the requested level, the data load device can load compression-encoded audio data, compression-encoded video data, an audio time stamp, and a video time stamp from the storage device without making the quantity of the compression-encoded audio data, the compression-encoded video data, the audio time stamp, and the video time stamp which are output from the data load device in excess or insufficient.

A network may be interposed among the audio decoding section 401, the video reproduction speed conversion section 403, and the data load device 407. In this case, the storage device 406 is, for example, an accumulation media in a server on the transmitting end.

The reproduction speed conversion apparatus 400 in FIG. 4 may be on the transmitting end.

The storage device 406 is, for example, a recording medium allowing for data recording and data reproduction, or a recording medium allowing only for data reproduction.

The recording medium allowing for data recording and data reproduction is, for example, a CD-R, CD-RW, DVD-RAM, DVD-R, DVD-RW, DVD+R or DVD+RW disc.

The recording medium allowing only for data reproduction is, for example, a DVD-Video disc or a CD.

The data load device 407 may include a de-multiplexer. When multiplexed data obtained by multiplexing compression-encoded audio data, compression-encoded video data, an audio time stamp, and a video time stamp is stored in the storage device 406, the de-multiplexer separates the multiplexed data into the compression-encoded audio data, the compression-encoded video data, the audio time stamp, and the video time stamp. The data load device 407 outputs the compression-encoded audio data to the audio decoding section 401, and outputs the compression-encoded video data to the video reproduction speed conversion section 403. The data load device 407 also outputs the audio time stamp and the video time stamp to the audio video synchronization section 405.

According to a reproduction speed conversion apparatus according to the present invention, when conversion to a reproduction speed corresponding to a requested level is determined to be impossible, a reproduction speed of video data and a reproduction speed of audio data are converted to a reproduction speed corresponding to a prescribed level lower than the requested level. Thus, even when the conversion to the reproduction speed corresponding to the requested level is impossible, the reproduction speed of video data and the reproduction speed of audio data are converted to an identical reproduction speed. As a result, reproduction of the video data is prevented from being delayed with respect to reproduction of the audio data.

According to a reproduction speed conversion apparatus according to the present invention, the data load device loads compression-encoded audio data and compression-encoded video data from the storage device, such that the compression-encoded audio data and the compression-encoded video data which are output from the data load device are not in excess or insufficient. As a result, even when the reproduction speed is changed from a reproduction speed corresponding to the requested level to a reproduction speed corresponding to a prescribed level lower than the requested level, the data load device can load compression-encoded audio data and compression-encoded video data from the storage device without making the quantity of the compression-encoded audio data and the compression-encoded video data which are output from the data load device in excess or insufficient.

According to a reproduction speed conversion apparatus according to the present invention, the audio video synchronization section synchronizes the timing for reproducing decoded video data and the timing for reproducing decoded audio data with each other. Thus, even when the reproduction speed is changed from a reproduction speed corresponding to the requested level to a reproduction speed corresponding to a prescribed level lower than the requested level, the timing for reproducing the video data can be synchronized to the timing for reproducing the audio data. As a result, even when the reproduction speed is thus changed, the timing for reproducing the video data and the timing for reproducing the audio data are prevented from being offset with respect to each other.

According to a reproduction speed conversion apparatus according to the present invention, the data load device loads compression-encoded audio data, compression-encoded video data, an audio time stamp, and a video time stamp from the storage device, such that the compression-encoded audio data, the compression-encoded video data, the audio time stamp, and the video time stamp which are output from the data load device are not in excess or insufficient. As a result, even when the reproduction speed is changed from a reproduction speed corresponding to the requested level to a reproduction speed corresponding to a prescribed level lower than the requested level, the data load device can load compression-encoded audio data, compression-encoded video data, an audio time stamp, and a video stamp from the storage device without making the quantity of the compression-encoded audio data, the compression-encoded video data, the audio time stamp, and the video time stamp which are output from the data load device in excess or insufficient.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

The invention claimed is:

1. A reproduction speed conversion apparatus, comprising:
   an audio decoding section for decoding compression-encoded audio data so as to output decoded audio data;
   an audio reproduction speed conversion section for converting a reproduction speed of the decoded audio data in response to a first reproduction speed signal representing a requested level of reproduction speed;
   a video reproduction speed conversion section for converting the reproduction speed of compression-encoded video data in response to the first reproduction speed signal; and
   a video decoding section for decoding the compression-encoded video data which is output from the video reproduction speed conversion section, wherein:
   the video reproduction speed conversion section determines whether reproduction speed conversion corresponding to the requested level is possible or not; when the reproduction speed conversion corresponding to the requested level is determined to be possible, the video reproduction speed conversion section performs reproduction speed conversion corresponding to the requested level; when the reproduction speed conversion corresponding to the requested level is determined to be impossible, the video reproduction speed conversion section performs reproduction speed conversion corresponding to a prescribed level lower than the requested level, and outputs a second reproduction speed signal representing the prescribed level to the audio reproduction speed conversion section, and
   the audio reproduction speed conversion section performs reproduction speed conversion corresponding to the prescribed level in response to the second reproduction speed signal from the video reproduction speed conversion section.

2. A reproduction speed conversion apparatus according to claim 1, wherein the video reproduction speed conversion section determines whether a ratio at which specific video data appears in the compression-encoded video data is larger than a threshold value determined in accordance with the requested level or not; and determines whether reproduction speed conversion corresponding to the requested level is possible or not based on the determination result.

3. A reproduction speed conversion apparatus according to claim 2, wherein the compression-encoded video data is video data in compliance with the MPEG Standards, and the specific video data is B-Picture.

4. A reproduction speed conversion apparatus according to claim 1, further comprising an audio video synchronization section for synchronizing a timing for reproducing the decoded audio data and a timing for reproducing the decoded video data with each other, in accordance with an audio time stamp representing a time for reproducing the decoded audio data and a video time stamp representing a time for reproducing the decoded video data,
   wherein:
   the audio reproduction speed conversion section transmits a signal representing the reproduction speed obtained by the audio reproduction speed conversion section to the audio video synchronization section, the audio video synchronization section generates audio decoded timing data representing a timing for decoding the compression-encoded audio data in response to the audio time stamp and the signal representing the reproduction speed obtained by the audio reproduction speed conversion section,
   the audio video synchronization section generates video decoding timing data representing a timing for decoding the compression-encoded video data in response to the video time stamp and the signal representing the reproduction speed obtained by the audio reproduction speed conversion section,
   the audio decoding section decodes the compression-encoded audio data in response to the audio decoding timing data, and
   the video decoding section decodes the compression-encoded video data in response to the video decoding timing data.

5. A reproduction speed conversion apparatus according to claim 4, further comprising:
   a storage device for storing the compression-encoded audio data and the compression-encoded video data; and
   a data load device for loading the compression-encoded audio data and the compression-encoded video data from the storage device,
   wherein:
   the audio reproduction speed conversion section transmits a signal representing a reproduction speed obtained by the audio reproduction speed conversion section to the data load device, and
   the data load device outputs the compression-encoded audio data loaded from the storage device to the audio decoding section, and outputs the compression-encoded video data loaded from the storage device to the video reproduction speed conversion section, in accordance with the signal transmitted from the audio reproduction speed conversion section.

6. A reproduction speed conversion apparatus according to claim 5, wherein:

the storage device stores the audio time stamp and the video time stamp, the data load device loads the audio time stamp and the video time stamp from the storage device, and the data load device outputs the audio time stamp and the video time stamp loaded from the storage device to the audio video synchronization section.

7. A reproduction speed conversion apparatus according to claim 4, further comprising:

a storage device for storing the compression-encoded audio data and the compression-encoded video data; and a data load device for loading the compression-encoded audio data and the compression-encoded video data from the storage device, wherein:

the video reproduction speed conversion section transmits a signal representing a reproduction speed obtained by the video reproduction speed conversion section to the data load device, and the data load device outputs the compression-encoded audio data loaded from the storage device to the audio decoding section, and outputs the compression-encoded video data loaded from the storage device to the video reproduction speed conversion section, in accordance with the signal transmitted from the video reproduction speed conversion section.

8. A reproduction speed conversion apparatus according to claim 7, wherein:

the storage device stores the audio time stamp and the video time stamp, the data load device loads the audio time stamp and the video time stamp from the storage device, and the data load device outputs the audio time stamp and the video time stamp loaded from the storage device to the audio video synchronization section.

9. A reproduction speed conversion apparatus according to claim 1, further comprising an audio video synchronization section for synchronizing a timing for reproducing the decoded audio data and a timing for reproducing the decoded video data with each other, in accordance with an audio time stamp representing a time for reproducing the decoded audio data and a video time stamp representing a time for reproducing the decoded video data, wherein:

the video reproduction speed conversion section transmits a signal representing the reproduction speed obtained by the video reproduction speed conversion section to the audio video synchronization section, the audio video synchronization section generates audio decoded timing data representing a timing for decoding the compression-encoded audio data in response to the audio time stamp and the signal representing the reproduction speed obtained by the video reproduction speed conversion section, the audio video synchronization section generates video decoding timing data representing a timing for decoding the compression-encoded video data in response to the video time stamp and the signal representing the reproduction speed obtained by the video reproduction speed conversion section, the audio decoding section decodes the compression-encoded audio data in response to the audio decoding timing data, and the video decoding section decodes the compression-encoded video data in response to the video decoding timing data.

10. A reproduction speed conversion apparatus according to claim 9, further comprising:

a storage device for storing the compression-encoded audio data and the compression-encoded video data; and a data load device for loading the compression-encoded audio data and the compression-encoded video data from the storage device, wherein:

the audio reproduction speed conversion section transmits a signal representing a reproduction speed obtained by the audio reproduction speed conversion section to the data load device, and the data load device outputs the compression-encoded audio data loaded from the storage device to the audio decoding section, and outputs the compression-encoded video data loaded from the storage device to the video reproduction speed conversion section, in accordance with the signal transmitted from the audio reproduction speed conversion section.

11. A reproduction speed conversion apparatus according to claim 10, wherein:

the storage device stores the audio time stamp and the video time stamp, the data load device loads the audio time stamp and the video time stamp from the storage device, and the data load device outputs the audio time stamp and the video time stamp loaded from the storage device to the audio video synchronization section.

12. A reproduction speed conversion apparatus according to claim 9, further comprising:

a storage device for storing the compression-encoded audio data and the compression-encoded video data; and a data load device for loading the compression-encoded audio data and the compression-encoded video data from the storage device, wherein:

the video reproduction speed conversion section transmits a signal representing a reproduction speed obtained by the video reproduction speed conversion section to the data load device, and the data load device outputs the compression-encoded audio data loaded from the storage device to the audio decoding section, and outputs the compression-encoded video data loaded from the storage device to the video reproduction speed conversion section, in accordance with the signal transmitted from the video reproduction speed conversion section.

13. A reproduction speed conversion apparatus according to claim 12, wherein:

the storage device stores the audio time stamp and the video time stamp, the data load device loads the audio time stamp and the video time stamp from the storage device, and the data load device outputs the audio time stamp and the video time stamp loaded from the storage device to the audio video synchronization section.

14. A reproduction speed conversion apparatus according to claim 1, further comprising:

a storage device for storing the compression-encoded audio data and the compression-encoded video data; and a data load device for loading the compression-encoded audio data and the compression-encoded video data from the storage device, wherein:
the audio reproduction speed conversion section transmits a signal representing a reproduction speed obtained by the audio reproduction speed conversion section to the data load device, and
the data load device outputs the compression-encoded audio data loaded from the storage device to the audio decoding section, and outputs the compression-encoded video data loaded from the storage device to the video reproduction speed conversion section, in accordance with the signal transmitted from the audio reproduction speed conversion section.

15. A reproduction speed conversion apparatus according to claim 14, wherein the storage device is a recording medium allowing for data recording and data reproduction, or a recording medium allowing only for data reproduction.

16. A reproduction speed conversion apparatus according to claim 1, further comprising:
a storage device for storing the compression-encoded audio data and the compression-encoded video data; and
a data load device for loading the compression-encoded audio data and the compression-encoded video data from the storage device,
wherein:
the video reproduction speed conversion section transmits a signal representing a reproduction speed obtained by the video reproduction speed conversion section to the data load device, and
the data load device outputs the compression-encoded audio data loaded from the storage device to the audio decoding section, and outputs the compression-encoded video data loaded from the storage device to the video reproduction speed conversion section, in accordance with the signal transmitted from the video reproduction speed conversion section.

17. A reproduction speed conversion apparatus according to claim 7, wherein the storage device is a recording medium allowing for data recording and data reproduction, or a recording medium allowing only for data reproduction.

* * * * *